April 3, 1945.   A. G. B. METCALF   2,372,968
SOUND GENERATOR
Filed April 22, 1942
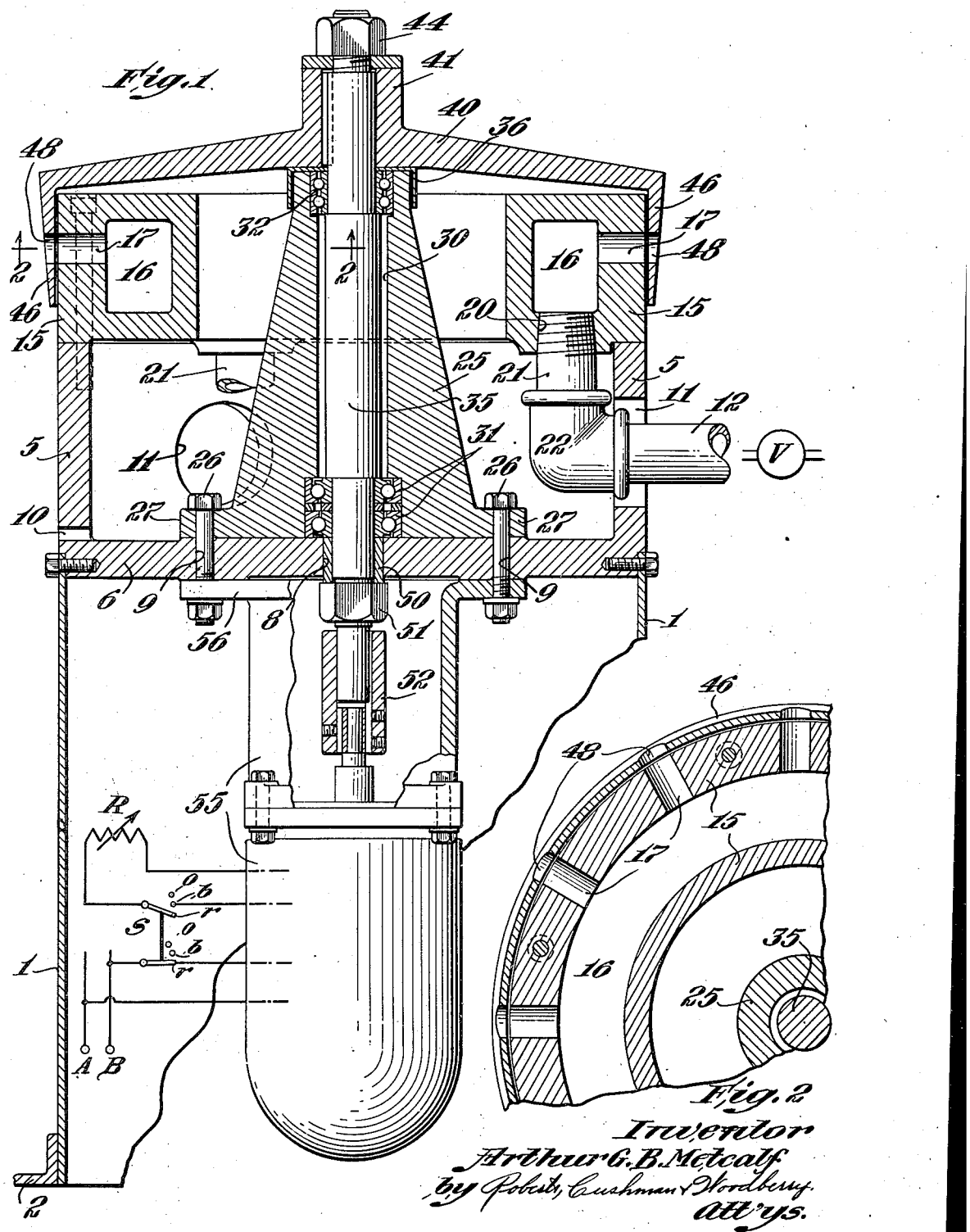
Inventor
Arthur G. B. Metcalf
by Robert, Cushman & Woodberg.
Att'ys.

Patented Apr. 3, 1945

2,372,968

UNITED STATES PATENT OFFICE 2,372,968

SOUND GENERATOR

Arthur G. B. Metcalf, Milton, Mass., assignor to North American Research Corporation, Cambridge, Mass., a corporation of Massachusetts Application April 22, 1942, Serial No. 439,997

1 Claim. (Cl. 116—147)

This invention relates to sound-generating devices of the type in which sound waves are produced by periodically releasing the pressure of a compressed gaseous fluid, the present application being a continuation-in-part of my copending application Serial No. 400,979, filed July 3, 1941.

The principal object of the invention is to provide a sound generator capable of emitting sound waves in all directions around its periphery, which is of simple design and of strong and durable construction, which is efficient and reliable in operation, and which has a minimum number of operating parts so arranged as to be adequately protected against injury and also corrosion incident to outdoor exposure, as when used for marine signaling.

Further objects will be apparent from the following description of an embodiment of the invention accompanied by a drawing, wherein Fig. 1 is a longitudinal, sectional view, with parts broken away, of a sound generator constructed in accordance with the present invention; and Fig. 2 is a section on the line 2—2 of Fig. 1.

In accordance with the present invention, the sound generator may comprise a member having an annular chamber formed with a plurality of circumferentially spaced outlet openings and one or more inlets communicating with a source of gaseous fluid under pressure which may be controlled so as to vary the wave amplitude or volume of the sound generated. The exits of the outlet openings are arranged in cooperative relationship with a valving member, such as a rotor, which likewise is formed with a plurality of circumferentially spaced openings adapted to register with the outlet openings in the chamber. The valving member or rotor may be driven, or relative rotation between the two members otherwise effected, by a motor, turbine or the like, the speed of which may, if desired, be varied so as to effect a corresponding variation in the frequency or pitch of the sound generated. The size, shape and relative arrangement of one or both sets of openings may be varied so as to secure a desired tone or combination of tones, the pitch and intensity of which may be varied as above indicated.

The embodiment herein shown for the purpose of illustration comprises a cylindrical base 1 having at its lower edge a flange 2 by means of which it may be firmly secured in place. The upper end of the base 1 supports a cylindrical casing 5 having its lower end closed by a wall or floor 6 formed with a central opening 8. The side wall of the casing is formed with a small drain opening 10 and one or more openings 11 through which pressure conduits 12 pass, the flow through the conduits being controlled by suitable valve means, designated by the letter V.

An annular fluid distributing member 15 is bolted or otherwise secured to the upper end of the casing 5 and is formed with an annular chamber 16 having in its outer peripheral wall a plurality of circumferentially spaced radially extending outlet openings 17, here shown as being of uniform circular cross section, although it is to be understood that the size, shape and arrangements of such openings may be varied in accordance with the desired tone or quality of sound to be generated. The floor or bottom wall of the chamber 16 is provided with inlet openings 20 which are connected by nipples 21 and elbows 22 to the pressure conduit or conduits 12.

An upstanding frusto-conically shaped column, co-axial with the annular member 15, is supported on the floor 6 and is anchored thereto by bolts 26 passing through its flange base 27 and through openings 9 of casing floor 6. The bore 30 of the column is enlarged at each end to receive ball bearing members 31 and 32 which rotatably support a drive shaft 35.

The upper end of the drive shaft 35 carries a cap 36 which fits about the upper end of the column 25 and protects the bearing members 32, preventing the entry of extraneous matter into the interior of the column. A valve member or rotor 40, formed with a hub 41, is keyed or otherwise secured to the upper end of the shaft 35 and is held in place by a nut 44 screwed to the reduced end of shaft 35. The peripheral edge of the body portion of the rotor is integral with a depending cylindrical flange or skirt 46 which extends in close proximity about the outer periphery of the member 15. The flange 46 has a plurality of circumferentially spaced valve openings 48 arranged to register with the outlet openings 17 in the annular member, as shown more clearly in Fig. 2. With this construction and arrangement the skirt 46, when rotated, alternately opens and closes the outlet openings 17, thereby periodically interrupting the flow of gaseous fluid with the consequent generation of sound, the intensity and pitch of which may be varied as indicated below. It will be understood that the relation of the sound generating openings 17 and 48 may be varied as to shape as well as number, again for the purpose of varying the characteristics of the generated sound.

The shaft 35 extends downwardly through a sleeve or bushing 50 in the opening 8, the bushing being adjustably held in place by the nut 51. The lower end of the shaft 35 is connected by a rigid coupling 52 to the drive shaft of a motor having an airtight housing 55. The upper end of the housing 55 is formed with laterally projecting lugs 56 through which pass the lower ends of the previously mentioned bolts 26. The motor within the housing 55 may be either of the constant or variable speed type and may be provided with any desired type of control equipment.

To operate the sound generator, the motor is first turned on and brought up to speed or adjusted to a predetermined speed, whereupon the valve means V in pressure conduit 12 is opened to permit a flow of gaseous fluid into the annular chamber 16. A given pressure in the chamber 16 and consequent flow of fluid through the outlet openings 17, and the rotation of the rotor 40 at a given speed generate a sound of predetermined pitch and intensity. The intensity of the sound may be varied by varying the flow of fluid from the chamber 16; the pitch of the sound may be separately varied by varying the speed of the motor; and both pitch and intensity may be simultaneously varied by concurrently varying both the speed of the motor and flow of fluid from the chamber 16.

It will be understood that sound generators of the present type may be driven by means other than electric motors; the latter, however, are especially suitable and, according to one aspect of the invention, may be used for quickly stopping the sound generating rotor which is often desirable. For that purpose, circuit arrangements similar to those indicated in Fig. 1 may be used. In the circuit of Fig. 1, AB is the supply line, S a double switch with contacts r, b, o, and R a braking resistor. During operation of the sound generator, contacts r are connected to the current source, but for rapidly stopping the machine, the motor 55 is by means of contacts b connected to resistor R, working as a generator and feeding the energy to be quickly eliminated into the resistor. With the switch S in position o, both energy source and braking resistor are disconnected from the electrodynamic machine.

It will be noted that a sound generator of this type will emit sound in all directions radially of its axis of rotation, without the aid of baffles, multiple horns or similar devices. For this purpose, the sound generating openings may be arranged normally to the axis of rotation of the horn as herein shown, or so inclined that their direction has a component which is radial relatively to the axis of rotation.

While I have shown and described one desirable embodiment of the invention, it is to be understood that this disclosure is for the purpose of illustration, and various changes in shape, proportion and arrangement of parts, as well as the substitution of equivalent elements for those herein shown and described, may be made without departing from the spirit and scope of the invention, as set forth in the appended claim.

I claim:

A sound generator comprising a base plate having on one side a cylindrical rim, a fluid distributor mounted on the edge of said rim and forming a closed annular chamber with a cylindrical exterior wall provided with a plurality of circumferentially spaced outlet openings, conduit means penetrating said rim for supplying a gaseous fluid under controlled pressure to said chamber, a shaft sleeve mounted on said side of said plate and extending above said chamber, a shaft extending through said plate and said sleeve, a bell-shaped valve member concentric with said distributor fixed to said shaft and having a peripheral flange extending about and in close proximity to said wall, said flange having a plurality of circumferentially spaced valve openings arranged to register with said outlet openings, and a motor mounted on the other side of said plate and connected to said shaft for rotating said valve member so as alternately to register the outlet and valve openings, thereby periodically interrupting the flow of gaseous fluid from said outlet openings.

ARTHUR G. B. METCALF.